United States Patent
Wilson et al.

(10) Patent No.: US 7,849,942 B2
(45) Date of Patent: Dec. 14, 2010

(54) DEEP WATER AMPHIBIOUS VEHICLE

(75) Inventors: Dean Randal Wilson, Marrero, LA (US); John Michael Wilson, Sr., Gretna, LA (US)

(73) Assignee: Wilco Marsh Buggies and Draglines, Inc., Harvey, LA (US)

( * ) Notice: Subject to any disclaimer, the term of this patent is extended or adjusted under 35 U.S.C. 154(b) by 132 days.

(21) Appl. No.: 11/952,542

(22) Filed: Dec. 7, 2007

(65) Prior Publication Data

US 2009/0149089 A1 Jun. 11, 2009

(51) Int. Cl.
*B62D 55/065* (2006.01)
(52) U.S. Cl. .................................. 180/9; 440/12.63
(58) Field of Classification Search ............. 114/382; 440/12.63, 12.64; D12/310, 315; 180/6.7, 180/9, 10
See application file for complete search history.

(56) References Cited

U.S. PATENT DOCUMENTS

| | | | | |
|---|---|---|---|---|
| 5,899,164 A | * | 5/1999 | Coast | 440/12.63 |
| 6,482,053 B1 | * | 11/2002 | Prestenbach | 440/12.63 |
| 6,918,801 B2 | * | 7/2005 | Wilson et al. | 440/12.63 |

* cited by examiner

*Primary Examiner*—Ed Swinehart
(74) *Attorney, Agent, or Firm*—Conley Rose, P.C.

(57) ABSTRACT

A vehicle is adapted to operate on land and in water having a depth of over four feet. The vehicle includes a chassis, one or more pontoons supported by the chassis, and a track system disposed on each of the one or more pontoons and adapted to provide propulsion to the vehicle. Each pontoon has a height of at least four feet, a width and a length adjacent to the land, wherein a ratio of the height to the width exceeds 1.4, and a volume configured to provide buoyancy and support the chassis weight.

13 Claims, 5 Drawing Sheets

FIG. 3

Exemplary Deep Water Marsh Buggies

| Buggy Weight Wt (lbs) | Max Water Depth D (ft) | Pontoon Dimensions | | | H/W | Buoyancy B (lbs) |
|---|---|---|---|---|---|---|
| | | Length $L_B$ (ft) | Height H (ft) | Width W (ft) | | |
| 155,000 | 7 | 32.0 | 8.0 | 5.50 | 1.45 | 153,507 |
| 160,000 | 7 | 33.0 | 8.0 | 5.50 | 1.45 | 158,304 |
| 165,000 | 7 | 33.0 | 8.0 | 5.65 | 1.42 | 162,622 |
| 200,000 | 7 | 40.5 | 8.0 | 5.65 | 1.42 | 199,581 |
| 150,000 | 6 | 40.5 | 7.0 | 4.95 | 1.41 | 149,875 |
| 200,000 | 8 | 32.0 | 9.0 | 6.25 | 1.44 | 199,360 |

Note: The above marsh buggies are equipped with two pontoons each having equal internal dimensions $W * L_B * H$.

US 7,849,942 B2

DEEP WATER AMPHIBIOUS VEHICLE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to amphibious vehicles and, more particularly, to amphibious vehicles for deep water operation.

2. Description of Related Art

Amphibious vehicles, known as marsh buggies, were first developed to support oil and gas exploration operations conducted in marshy or swampy terrain. Marsh buggies typically include a pair of pontoons connected to a center platform. The pontoons are usually surrounded by a cleated track system that is capable of engaging ground or swamp land to propel the vehicle. The track system uses one or more endless chains surrounding the periphery of each pontoon. The endless chains, supporting the cleated tracks, are driven about the periphery of the pontoons, by a sprocket or other means, in order to provide propulsion to the vehicle. By varying the track speed around each pontoon, the vehicle can be advanced, turned, or reversed.

Marsh buggies are ideal for operation in wetlands, marshlands, and other low-lying areas. Moreover, many have been adapted to haul personnel and cargo as well as serve as the operating platform for various types of equipment, such as excavators, draglines, and backhoes. Typically the top several inches of the ground in wetlands, marshlands, and other low-lying areas are mud or soft terrain which cannot support weight. Beneath the mud or soft terrain is more solid ground that can support weight. During operation of a marsh buggy, the cleated tracks surrounding each pontoon sink into the soft terrain, or mud, until the tracks contact the harder, more solid soil beneath the soft terrain. Contact between the cleated tracks and the harder soil provides traction for the marsh buggy, allowing the marsh buggy, including personnel, cargo and additional equipment, to maneuver through the soft terrain.

Marsh buggies are also often capable of floating in order to navigate small bodies of water. However, these vehicles aren't designed to operate while floating. Thus, marsh buggies are limited in performing earth-moving operations to dry land or water where their pontoons are resting on the ground. Many conventional marsh buggies are typically limited to operations on dry land and in water less than three to four feet deep. As global warming progresses and water levels continue to rise, this constraint increasingly restricts the use of conventional marsh buggies as water depths have increased.

Thus, there is an increasing need in the art for a self-propelled, amphibious vehicle capable of supporting operations on land and in deep water. Therefore, the embodiments of the present invention are directed to deep water amphibious vehicles and their methods of design.

SUMMARY OF THE PREFERRED EMBODIMENTS

The present invention solves these and other needs in the art by providing an amphibious vehicle that is capable of supporting operations on land and in deep water having a depth over four feet. The vehicle includes a chassis having a weight, at least two pontoons supported by the chassis for supporting the chassis weight, and a track system disposed on each of the pontoons and adapted to propel the vehicle. Each pontoon preferably has a height of at least four, and more preferably of at least seven feet, a width and a length adjacent to the land, wherein a ratio of the height to the width exceeds 1.4, and a volume configured to provide buoyancy and support the chassis weight.

Some method embodiments for the design of a pontoon for an amphibious vehicle operable in a marsh with deep water and a density include determining a total weight of the vehicle and equipment positioned thereon, determining the maximum water depth in the marsh, selecting a height of the pontoon as a function of the maximum water depth, selecting a width of the pontoon that is less than 71% of the height of the pontoon, and selecting a length of that portion of the pontoon adjacent the ground such that a buoyancy force exerted by the water on the vehicle is less than the total weight.

Thus, the present invention comprises a combination of features and advantages that enable it to provide for an amphibious vehicle that is operable on land and in water deeper than that limiting the use of conventional amphibious vehicles. These and various other characteristics and advantages of the preferred embodiments will be readily apparent to those skilled in the art upon reading the following detailed description and by referring to the accompanying drawings.

BRIEF DESCRIPTION OF THE DRAWINGS

For a more detailed understanding of the preferred embodiments, reference is made to the accompanying Figures, wherein:

FIG. 3 depicts tabular summary of exemplary deep water marsh buggies;

NOTATION AND NOMENCLATURE

Figure 1:
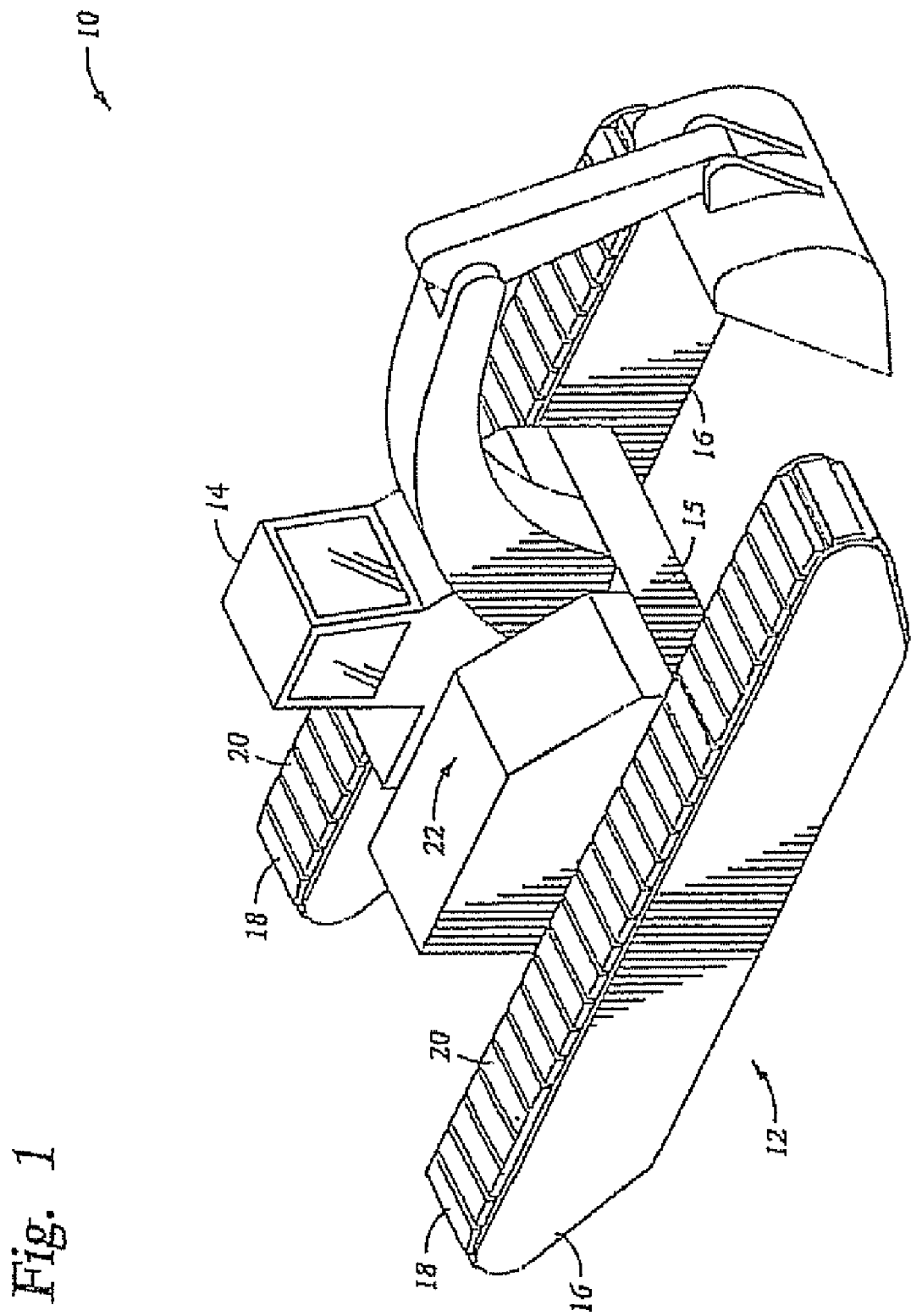
FIG. 1 is an isometric view of a deep water amphibious vehicle.

Certain terms are used throughout the following description and claims to refer to particular system components. This document does not intend to distinguish between components that differ in name but not function. Moreover, the drawing figures are not necessarily to scale. Certain features of the invention may be shown exaggerated in scale or in somewhat schematic form, and some details of conventional elements may not be shown in the interest of clarity and conciseness.

In the following discussion and in the claims, the term "comprises" and "comprising" are used in an open-ended fashion, and thus should be interpreted to mean "including, but not limited to . . . ". Also, the term "couple" or "couples"

is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Some embodiments of the present invention provide a method for designing pontoons for amphibious vehicles, or marsh buggies, such that a marsh buggy comprising the pontoons is capable of operation in deep water, herein defined by depths greater than four feet, the maximum operating depth for conventional amphibious vehicles. Also, some embodiments of the present invention are pontoons that may be represented by specific design criteria which balance the effects of buoyancy in water and vehicle weight on marsh land. Furthermore, in some embodiments, the pontoons may be coupled to other components or systems to form a deep water marsh buggy.

Referring now to FIG. 1, a deep water marsh buggy 10 is shown including a chassis 12 having one or more chassis cross members 15 to support selected machinery 14 thereon. Machinery 14 can be selected from a wide assortment of heavy equipment and personnel platforms, but for illustration purposes is shown in FIG. 1 as a hydraulic excavator 14. Marsh buggy 10 further includes two pontoons 16, which are connected by chassis cross members 15 and equipped with endless-chain tracks 18 having a plurality of cleats 20. A drive system (not shown) is used to independently rotate endless tracks 18 about their respective pontoons 16. The rotation of endless tracks 18 is the primary method of positioning and guiding marsh buggy 10. By varying the speed and direction of each track 18, marsh buggy 10 is able to advance, change course, or reverse. Pontoons 16 are rigid hollow structures, typically air-filled, that provide buoyancy or "flotation" in amphibious environments to stabilize and support marsh buggy 10 with machinery 14.

Over the years, improvements in the structure and integrity of pontoons 16 allow marsh buggy 10 to work in more difficult terrain and operating environments. The pontoons 16 are typically constructed of steel or aluminum alloys and capable of flotation. However, when machinery 14, which may include a hydraulic excavator, as shown in FIG. 1, a backhoe, shovel, and/or loader, is operational or it is desirable to reposition the marsh buggy 10 using its drive system, contact between tracks 18 and the marshy ground is necessary. In other words, to operate machinery 14 or maneuver marsh buggy 10 using its drive system, marsh buggy 10 must not be floating where the tracks 18 of the marsh buggy would be unable to obtain sufficient traction to move the marsh buggy over the marsh land. Therefore, pontoons 16 must be sized such that marsh buggy 10 does not float in water where it is desired to operate marsh buggy 10, including machinery 14 positioned thereon. At the same time, pontoons 16 must be sized to provide sufficient buoyancy to stabilize and support marsh buggy 10 and machinery 14 when marsh buggy 10 is operating in water or swampy terrain.

To prevent premature floatation, meaning floatation of marsh buggy 10 in water where it is desired to operate the buggy, it is important not to size the pontoons 16 such that they provide too much buoyancy. Thus, the natural inclination would be to make the pontoons 16 narrower and/or shorter to avoid premature floatation. However, such changes in the pontoons 16 dimensions also reduce the vehicle's footprint, defined as the area of the pontoons 16 in contact with the marshy ground. As the footprint becomes smaller, movement of the marsh buggy 10 via its cleated track system may become more difficult. The cleated track system requires a minimum size for the operation of the cleats around the pontoons and, if the cleats are too small, there may be insufficient traction with the ground for movement in the marsh.

Further complicating the design of pontoons 16 is the desire to operate marsh buggies in deep water. As previously discussed, conventional marsh buggies have pontoons sized to allow the buggy to operate in waters up to four feet deep. Operating a conventional marsh buggy in deeper water, e.g., four to seven feet of water, is not possible due to limitations of conventional pontoons. First, the height of the pontoons may be less than the water depth. Second, the pontoons may provide too much buoyancy, such as being too wide, which would cause the marsh buggy to float prematurely. Moreover, simply increasing the pontoon height to overcome the first limitation worsens the second limitation.

Figure 2:
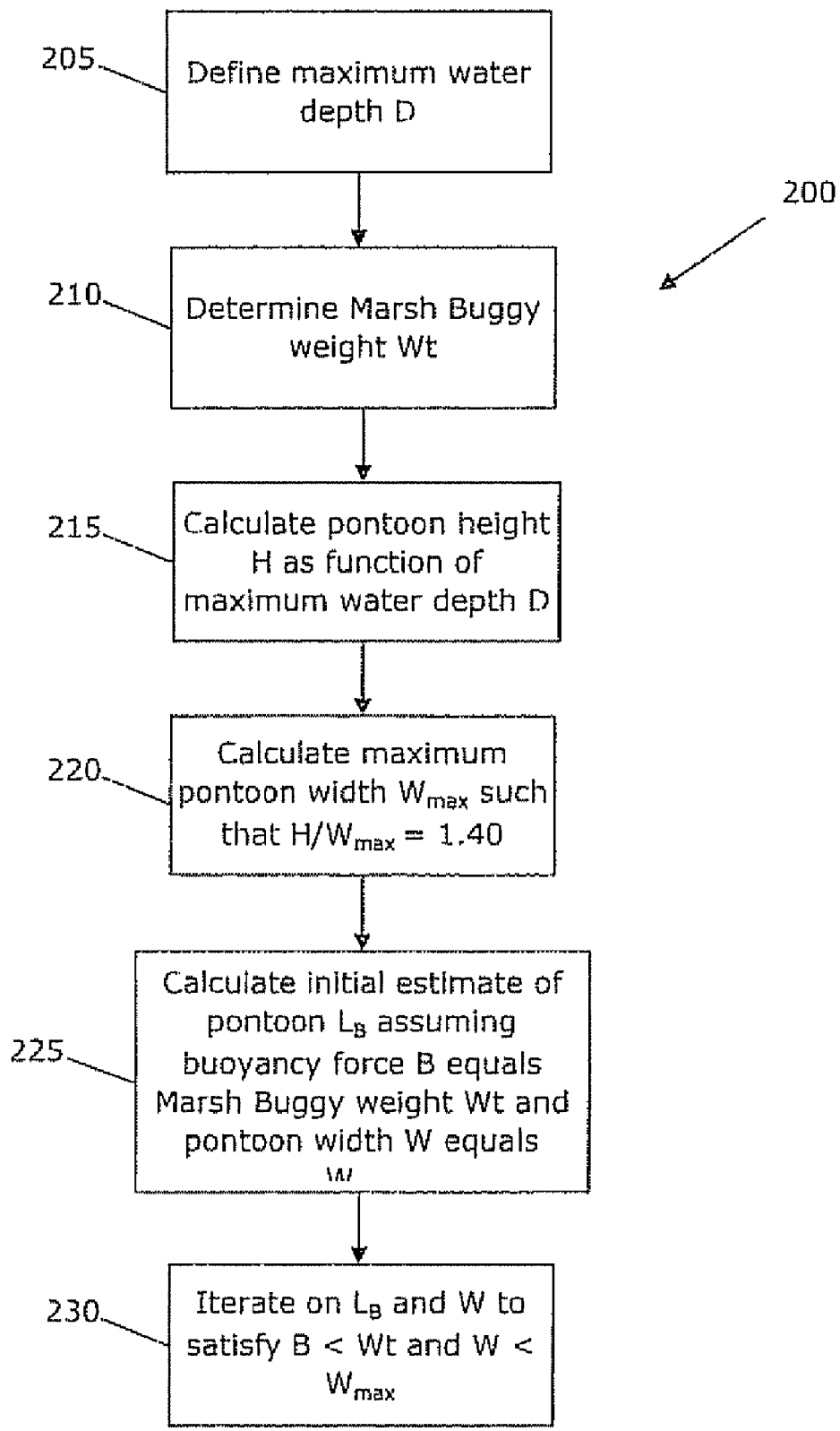
FIG. 2 depicts an illustrative method embodiment for designing a pontoon for a deep water marsh buggy.

Some embodiments of the present invention disclose methods for designing pontoons for use in deep marsh buggies, including the exemplary method 200 depicted in FIG. 2. Method 200 is applicable in all water depths, although water depths specifically mentioned herein exceed conventional depths, or four feet. Moreover, method 200 is applicable for varying vehicle weights.

Method 200 begins by defining the maximum water depth D in which a marsh buggy is expected to operate (block 205). Next, the weight Wt of the marsh buggy is determined and includes all weight associated with the vehicle itself as well as the machinery 14 to be supported thereon (block 210).

Defining the maximum operating water depth D identifies the minimum height of the pontoons. When the marsh buggy operates in water, it is desirable that the pontoons extend above the water surface so that marsh buggy surfaces on which machinery 14 is supported and accessed by personnel are not submerged. Thus, the pontoon height H is determined by the following equation:

$$H = D + c \tag{1}$$

wherein c is the selected clearance distance between the water surface at the maximum operating depth D and the top of the pontoons (block 215). In some method embodiments, clearance c may be one foot or more, while in other embodiments it may take another value.

Next, the pontoon width W is determined from the pontoon height H such that the marsh buggy footprint provides adequate area for the operation of the cleated track system and adequate traction for the marsh buggy, including machinery 14 supported thereon, allowing the vehicle to propel itself by rotating its tracks, on dry ground as well as in swampy terrain or mud. The marsh buggy footprint is the sum of the pontoon footprints, each defined as the surface area of the track, which surrounds a pontoon, in contact with the harder, more solid ground beneath the swampy terrain or mud. Thus, the pontoon footprint is dependent on the dimensions of the pontoon surface in contact with ground.

In some embodiments, the pontoon for a deep water marsh buggy is in the shape of a trapezoid having external dimensions of width W, height H, length $L_B$, and length $L_T$, where length $L_B$ is the length of the pontoon in contact with the ground and $L_T$ is the length of the pontoon along its upper surface or top. For these embodiments, the pontoon footprint FB is determined by:

$$FB = W \cdot L_B \tag{2}$$

Experience has shown that a pontoon with height-to-width H-W ratios exceeding 1.4 produces an adequate footprint FB for the marsh buggy. This relationship may be expressed:

$$H/W > 1.4 \quad (3)$$

Based on equation (3), the pontoon maximum external width $W_{max}$ may be calculated (block 220):

$$W_{max} = H \div 1.4 \quad (4)$$

In order to prevent premature floatation, meaning floatation of the marsh buggy in water having a depth less than or equal to the maximum operating water depth D, the buoyancy force exerted on the pontoons by surrounding water must be less than the weight Wt of the marsh buggy, or $$B < Wt \quad (5)$$

wherein B is the buoyancy force. Due to the design constraints represented by equations (1) and (5), the buoyancy provided by the pontoons is less than the vehicle weight Wt in water having a depth less than or equal to the maximum operating water depth D. Thus, in these conditions, the vehicle does not float. In deeper water, however, the buoyancy provided by the pontoons is greater than the vehicle weight Wt, and the vehicle will float.

The buoyancy force B on the marsh buggy by the water is determined by:

$$B = \rho_{water} V_{sub} \quad (6)$$

wherein $\rho_{water}$ is the density of the water and $V_{sub}$ is the volume of water displaced by the submerged pontoons, or the submerged volume of the pontoons. The volume of water displaced by a submerged pontoon is determined by multiplying the submerged side area $A_{side}$ of the pontoon times the external width W of the pontoon.

As stated above, in some embodiments, the pontoon is generally shaped like a trapezoid having external dimensions of width W, height H, bottom length $L_B$, and top length $L_T$. Thus, the submerged side area of the pontoon is approximated by:

$$A_{side} = \frac{(L_D + L_B)}{2} \cdot D \quad (7)$$

wherein $A_{side}$ is the submerged side area of the pontoon and $L_D$ is the length of the pontoon at the water surface. If the pontoon is entirely submerged, $L_D$ equals $L_T$. The volume $V_{sub}$ of water displaced by N submerged trapezoidal pontoons is then calculated by:

$$V_{sub} = N \cdot \frac{(L_D + L_B)}{2} \cdot D \cdot W \quad (8)$$

Combining equations (6) and (8), the buoyancy force B exerted on the marsh buggy by the surrounding water is:

$$B = \rho_{water} N \cdot \frac{(L_D + L_B)}{2} \cdot D \cdot W \quad (9)$$

For even greater accuracy, the buoyancy force of mud may be taken into consideration as well. When the marsh buggy operates in water, buoyancy forces from displaced water as well as displaced mud act on the pontoons. To also account for the latter, the buoyancy force $B_{mud}$ on the marsh buggy by the mud is determined by:

$$B_{mud} = \rho_{mud} V_{sub,mud} \quad (10)$$

wherein $\rho_{mud}$ is the density of the mud and $V_{sub,\,mud}$ is the volume of mud displaced by the pontoons. However, generally the mud buoyancy force is negligible compared to the water buoyancy force and need not be taken into account.

Equation (8) may be simplified by assuming the volume of water displaced by a single pontoon is substantially equal to a volume of water having dimensions width W×height D×length $L_B$. As such, the displaced water volume $V_{sub}$ is expressed as:

$$V_{sub} = N \cdot L_B \cdot D \cdot W \quad (11)$$

Substituting equation (11) into equation (6), the buoyancy force B is:

$$B = N \rho_{water} D L_B W \quad (12)$$

An initial estimate of the pontoon length $L_B$ may be determined using equation (12) by assuming the buoyancy force B equals the weight Wt of the marsh buggy and, as an initial estimate, the pontoon width W equals the maximum pontoon width $W_{max}$ (block 225). Note that the pontoon length $L_B$ calculated using equation (12) and the defined assumptions is an upper limit. Pontoons having external dimensions $W_{max} \times L_B$ in water having a depth equal to the maximum operating depth D provide a buoyancy force B equal to the marsh buggy weight Wt. To prevent premature floatation, the buoyancy force B must be less than the marsh buggy Wt.

To arrive at the final external pontoon dimensions, an iterative process is used (block 230). Values for the pontoon width W and/or length $L_B$ are iteratively adjusted from their initial estimates to maximize buoyancy B, while continuing to satisfy the constraints defined by equation (3) and (5), until final pontoon dimensions are defined. This iterative process also allows the selection of convenient values for pontoon width W and length $L_B$ for the purposes of manufacturing.

To illustrate method 200, assume that a marsh buggy has a total weight Wt equal to 155,000 lbs and two trapezoidal pontoons with identical external dimensions, characterized by width W, bottom length $L_B$, and height H. Assume further that it is desired to operate the marsh buggy in water having a maximum depth equal to seven feet, i.e., the maximum operating water depth D is seven feet, that the minimum clearance c between the top of the pontoons and the water surface is one foot, and that the volume of water displaced by each pontoon is substantially equal to a volume of water having dimensions width W×height D×length $L_B$, i.e., equation (12) applies. Following method 200, the pontoon height H is calculated using equation (1) and equals eight feet. A maximum pontoon width $W_{max}$ is calculated next using equation (5) and equals 5.71 feet.

As explained above, determining the pontoon width W and length $L_B$ is an iterative process. Assuming as an initial estimate that the pontoon width W equals $W_{max}$ and the buoyancy force B equals Wt, length $L_B$ is estimated as 31.1 feet using equation (12). Thus, two trapezoidal pontoons having dimensions 5.71 feet wide (W)×31.1 feet long ($L_B$)×8 feet tall (H) in 7 feet of water provide a buoyancy force B equal the marsh buggy Wt, or 155,000 lbs. However, it is desirable that the buoyancy force B is less than the marsh buggy weight Wt in 7 feet of water so that the marsh buggy does not float prematurely. Also, the pontoon width W of 5.71 feet and length $L_B$ of 31.1 feet are not convenient values for manufacturing purposes. Therefore, these dimensions are iteratively adjusted using equations (3) and (12) until convenient values are determined which also satisfy the constraints of equations (3) and (5). Through iteration, a pontoon width W equal to 5.5 feet and a pontoon length $L_B$ equal to 32 feet satisfy the defined criteria and are convenient dimensional values.

Based on the above illustrative method 200, N pontoons may be designed, where each pontoon has a buoyancy volume with dimensions width W×length $L_B$×height D and a manufactured volume with dimensions width W×length $L_B$×height H. Moreover, method 200 permits the pontoons to be designed such that the buoyancy provided by the pontoons does not cause premature floatation of the marsh buggy 10 in water having a depth less than or equal to the maximum operating water depth D (i.e., B<Wt) and such that the footprint of the pontoons 16 is adequate to operate the cleated track system and adequate traction for the marsh buggy 10 (i.e., H/W>1.4).

Embodiments of pontoon(s) enabling the operation of water marsh buggies in deep water may be generally represented by the design criteria defined by equations (3) and (5). Some specific examples of deepwater marsh buggies satisfying this design criteria are summarized in a table shown in FIG. 3, including the example presented above. As shown, a marsh buggy 30 having a total weight equal to 155,000 lbs is operational in water up to seven feet deep when equipped with two pontoons, each pontoon having external dimensions 5.5 ft wide (W)×32 feet long ($L_B$)×8 feet tall (H). Marsh buggy 30 will not float prematurely, meaning marsh buggy 30 will not float in less than or equal to 7 feet of water. Moreover, the footprint of each pontoon, defined by the 5.5 feet wide (W)× 32 feet ($L_B$) long bottom pontoon surface, is adequate to allow cleated track system to operate and for the marsh buggy 30 to gain traction in swampy terrain.

Figure 4:
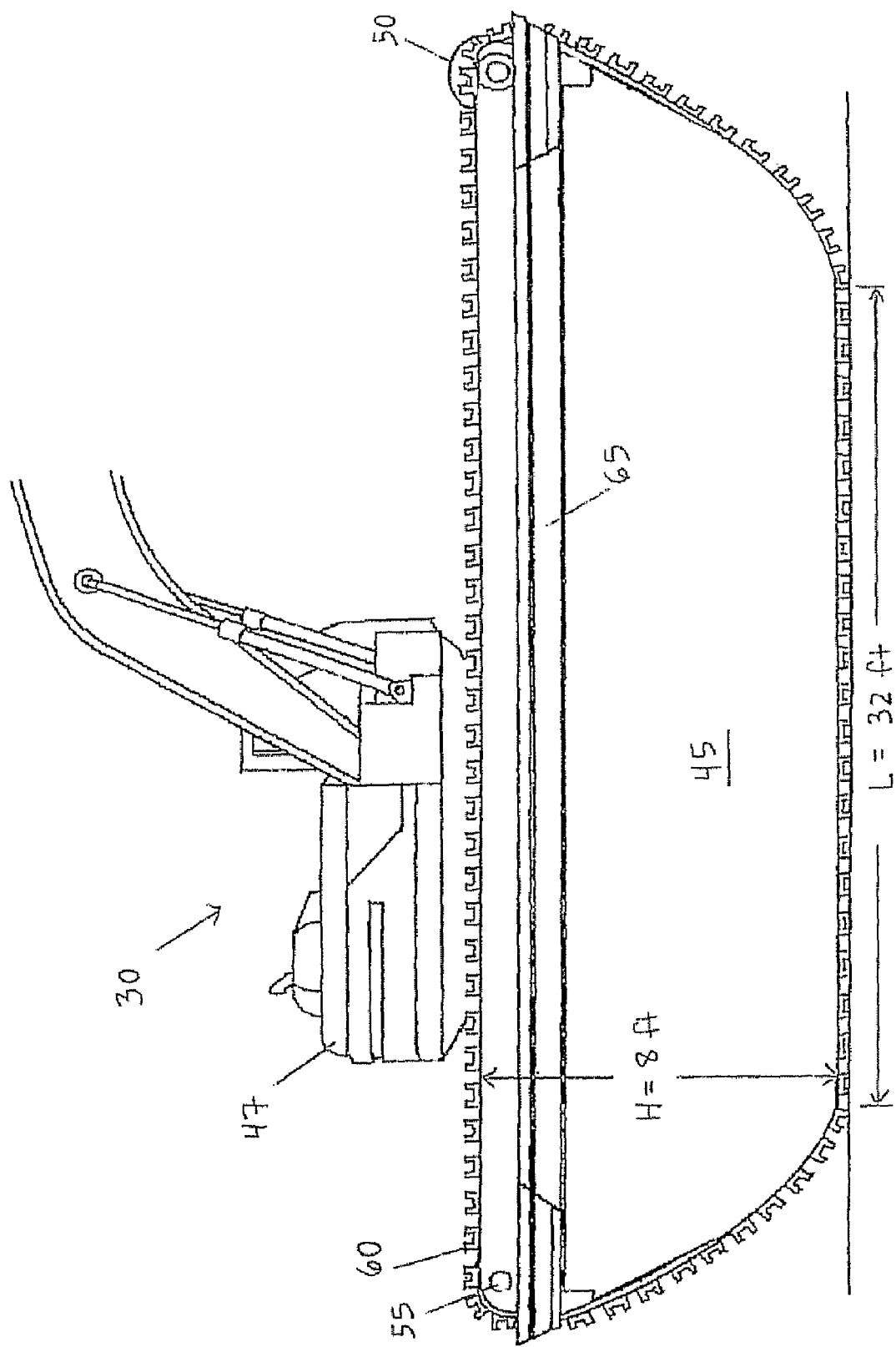
FIG. 4 is side view of one embodiment of a deep water marsh buggy.
Figure 5:
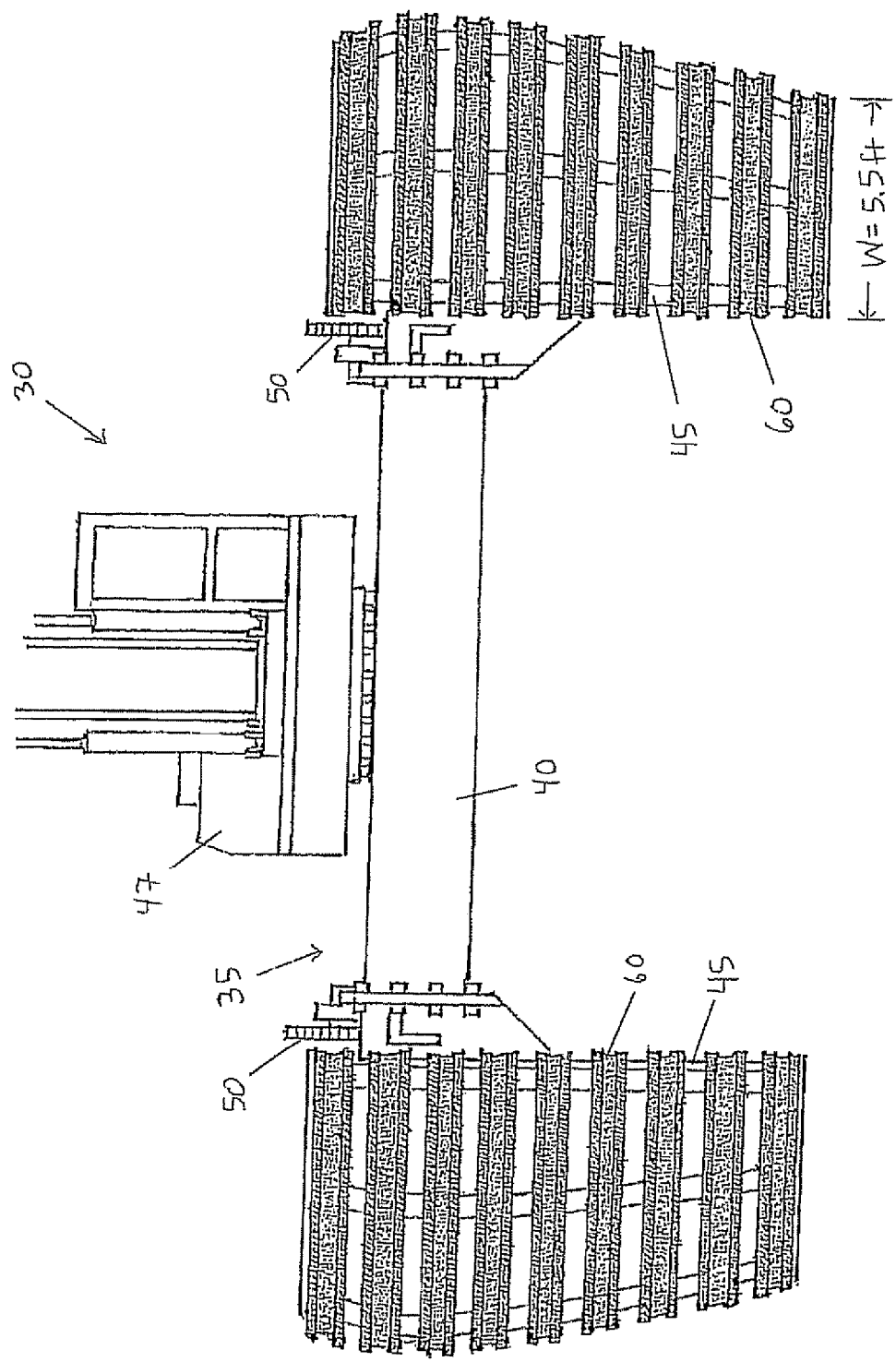
FIG. 5 is a front view of the deep water marsh buggy shown in FIG. 4.

FIGS. 4 and 5 are front and side views, respectively, of marsh buggy 30. As shown, marsh buggy 30 comprises chassis 35 having one or more cross members 40 which couples two pontoons 45 with machinery 47 positioned thereon. A track 60 surrounds each pontoon 45 and is driven by drive system 50 to maneuver marsh buggy 30. In some embodiments, pontoons 45 may include structural reinforcement, such as but not limited to, external reinforcement bands 65 and/or internal ribs (not shown).

Moreover, each pontoon 45 is generally trapezoidal in shape, having dimensions 5.5 feet (W)×8 feet (H)×32 feet ($L_B$)×length ($L_T$). Due to the assumption underlying equation (11), length $L_T$ is not needed for the purpose of identifying pontoon dimensions that provide optimal buoyancy B and footprint FB, or in other words, satisfy the design criteria of equations (3) and (5), i.e., H/W>1.4 and B<Wt, respectively. Even so, length $L_T$ must be defined for other purposes, including manufacturing.

In some embodiments of trapezoidal shaped pontoons, including those depicted in FIGS. 4 and 5, length $L_T$ is greater than length $L_B$. Furthermore, in some embodiments, length $L_T$ is proportional to $L_B$, for example, 12.5% longer. By defining such a relationship between lengths $L_T$ and $L_B$, length $L_T$ may be determined from length $L_B$. The pontoons depicted in FIGS. 4 and 5 are based on an assumption that length $L_T$ is 12.5% longer than $L_B$, or 36 feet. Thus, the final pontoon 45 dimensions are 5.5 feet (W)×8 feet (H)×32 feet ($L_B$)×36 feet ($L_T$).

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the present inventive concept, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A vehicle operable on dry or marsh land with water, the vehicle comprising:
    a chassis having a weight;
    two pontoons supporting the chassis, each pontoon having a height and a pontoon bottom adjacent to the land, the pontoon bottom having a width and a length, a ratio of the height to the width exceeding 1.4, and a volume, wherein the sum of the volume for one pontoon and the volume for the other pontoon is configured to provide buoyancy less than the chassis weight; and
    a track system disposed on each of the pontoons and adapted to propel the vehicle, the track system engaging the land when the vehicle is submerged in water having a depth in excess of four feet and less than the height of the pontoons.

2. The vehicle of claim 1, further comprising a piece of earth excavating equipment supported by the chassis and having an equipment weight.

3. The vehicle of claim 2, wherein the volume of each of the pontoons is further configured to support the equipment weight.

4. The vehicle of claim 3, wherein the buoyancy provided by the pontoons is less than a combined weight of the chassis and equipment.

5. The vehicle of claim 4, wherein the combined weight is substantially 150,000 lbs.

6. The vehicle of claim 1, wherein each of the pontoons is configured to allow the track system to contact the land when the vehicle is operating.

7. The vehicle of claim 6, wherein the track system contacts the land over a footprint area defined by the width and the length of a bottom of the pontoon adjacent to the land.

8. The vehicle of claim 7, wherein the bottom width is substantially equal to 5.5 feet and the bottom length is substantially equal 32 feet for each of the pontoons.

9. The vehicle of claim 1, wherein the pontoons have sides that are substantially trapezoidal in shape.

10. The vehicle of claim 9, wherein each pontoon has a lower surface defined by the length adjacent to the land and an upper surface opposite the lower surface, the upper surface defined by a second length, wherein the length adjacent to the land is less than the second length.

11. The vehicle of claim 10, wherein each pontoon has a manufactured volume defined by the width, the height, the length adjacent to the land, and the second length.

12. The vehicle of claim 11, wherein the width is substantially equal to 5.5 feet, the height is substantially equal to 8 feet, the bottom length is substantially equal to 32 feet, and the second length is substantially equal to 36 feet.

13. The vehicle of claim 12, wherein each pontoon has a buoyancy volume, the buoyancy volume equal to that portion of the volume that is submerged.

* * * * *